United States Patent
Smirnova et al.

(10) Patent No.: US 11,955,626 B2
(45) Date of Patent: Apr. 9, 2024

(54) CATHODE STRUCTURE FUNCTIONALIZATION WITH POLYOXOMETALATES IN CONTACT WITH SOLID-STATE ELECTROLYTE FOR IMPROVED ALL-SOLID-STATE LITHIUM-ION BATTERY PERFORMANCE

(71) Applicant: South Dakota Board of Regents, Pierre, SD (US)

(72) Inventors: Alevtina Smirnova, Rapid City, SD (US); Abu Md Numan-Al-Mobin, Rapid City, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 233 days.

(21) Appl. No.: 17/404,796

(22) Filed: Aug. 17, 2021

(65) Prior Publication Data

US 2022/0059823 A1    Feb. 24, 2022

Related U.S. Application Data

(60) Provisional application No. 63/067,396, filed on Aug. 19, 2020.

(51) Int. Cl.
   *H01M 4/00*    (2006.01)
   *H01M 4/136*    (2010.01)
   (Continued)

(52) U.S. Cl.
   CPC ........... *H01M 4/366* (2013.01); *H01M 4/136* (2013.01); *H01M 4/5825* (2013.01);
   (Continued)

(58) Field of Classification Search
   CPC ........... H01M 10/0525; H01M 10/052; H01M 10/0562; H01M 4/58; H01M 4/136
   See application file for complete search history.

(56) References Cited

U.S. PATENT DOCUMENTS

2018/0277830 A1    9/2018 King

FOREIGN PATENT DOCUMENTS

CN    102136573 A * 7/2011

OTHER PUBLICATIONS

Wu et al., Modification Positive Electrode Material Of Magnesium Secondary Battery And Preparation Method Thereof, Jul. 27, 2011, See the Abstract. (Year: 2011).*

(Continued)

*Primary Examiner* — Cynthia H Kelly
*Assistant Examiner* — Monique M Wills
(74) *Attorney, Agent, or Firm* — Goodhue, Coleman & Owens, P.C.

(57) ABSTRACT

The present disclosure relates to mixed ionically and electronically conducting solid-state phases for their application in electrochemical devices, such as lithium-metal or lithium ion batteries. The solid-state mixed phase comprises of active cathode and carbon-based structures functionalized by a heteropolyacid (HPA) or a metal salt of a heteropolyacid (Me-HPA) to form a solid-state architecture with incorporated ceramic or glass-ceramic electrolyte for enhanced ionic and electronic conductivity pathways. Combining the solid-state phase components in melted solid-state electrolyte results in perfect distribution, improved adhesion between particles, and improved characteristics of the electrochemical device, such as high charge rates, long-term performance, and broad voltage window.

18 Claims, 9 Drawing Sheets

(51) Int. Cl.

| | |
|---|---|
| *H01M 4/36* | (2006.01) |
| *H01M 4/58* | (2010.01) |
| *H01M 4/62* | (2006.01) |
| *H01M 10/052* | (2010.01) |
| *H01M 10/0525* | (2010.01) |
| *H01M 10/0562* | (2010.01) |
| *H01M 4/02* | (2006.01) |

(52) U.S. Cl.
CPC ......... *H01M 4/625* (2013.01); *H01M 10/052* (2013.01); *H01M 10/0525* (2013.01); *H01M 10/0562* (2013.01); *H01M 2004/028* (2013.01); *H01M 2300/008* (2013.01)

(56) References Cited

OTHER PUBLICATIONS

Duan et al., All-solid-state Lithium-ion Battery Comprises Positive Electrode Material Including Positive Electrode Active Material, Conductive Agent And Electrolyte, Positive And Negative Electrode Insulating Layer, And Negative Electrode Material, Jun. 13, 2017, See the Abstract. (Year: 2017).*

Degirmenci, L.; Oktar, N.; Dogu, G., ETBE synthesis over silicotungstic acid and tungstophosphoric acid catalysts calcined at different temperatures. Fuel Processing Technology 2010, 91 (7), 737-742.

Gao, H.; Lian, K., Characterizations of proton conducting polymer electrolytes for electrochemical capacitors. Electrochimica Acta 2010, 56 (1), 122-127.

Geng, T.; Du, C.; Cheng, X.; Xu, X.; Jian, J.; He, X.; Zuo, P.; Yin, G., A multifunctional silicotungstic acid-modified Li-rich manganese-based cathode material with excellent electrochemical properties. Journal of Solid State Electrochemistry 2019, 23 (1), 101-108.

Huang, Q.; Wei, T.; Zhang, M.; Dong, L.-Z.; Zhang, A.-M.; Li, S.-L.; Liu, W.-J.; Liu, J.; Lan, Y.-Q., A highly stable polyoxometalate-based metal-organic framework with π-π stacking for enhancing lithium ion battery performance. Journal of Materials Chemistry A 2017, 5 (18), 8477-8483.

Lavrencic Štangar, U.; Grošelj, N.; Orel, B.; Colomban, P., Structure of and interactions between P/SiWA keggin nanocrystals dispersed in an organically modified electrolyte membrane. Chemistry of materials 2000, 12 (12), 3745-3753.

Mioč, U.; Todorović, M.; Davidović, M.; Colomban, P.; Holclajtner-Antunović, I., Heteropoly compounds—From proton conductors to biomedical agents. Solid State Ionics 2005, 176 (39-40), 3005-3017.

Sonoyama, N.; Suganuma, Y.; Kume, T.; Quan, Z., Lithium intercalation reaction into the Keggin type polyoxomolybdates. Journal of Power Sources 2011, 196 (16), 6822-6827.

Tjapkin, N.; Davidović, M.; Colomban, P.; Mioč, U., Complex dielectric permittivity, bulk and surface conductivity of 12-tungstophosphoric acid hexahydrate and its dehydrated forms. Solid State Ionics 1993, 61 (1-3), 179-185. (Submitting Abstract).

Ya-guang, C.; Cun-guo, W.; Xi-yan, Z.; De-min, X.; Rong-shun, W., Syntheses and application of all-lithium salts of heteropolyacid as electrolyte of lithium-ion battery. Synthetic Metals, 2011, 20 (1), 77-80.

Yang, X.-Y.; Wei, T.; Li, J.-S.; Sheng, N.; Zhu, P.-P.; Sha, J.-Q.; Wang, T.; Lan, Y.-Q., Polyoxometalate-incorporated metallapillararene/metallacalixarene metal-organic frameworks as anode materials for lithium ion batteries. Inorganic chemistry 2017, 56 (14), 8311-8318.

Yeo, H. J.; Paik, Y.; Paek, S.-M.; Honma, I., Keggin-type aluminum polyoxocation/graphene oxide hybrid as a new nanostructured electrode for a lithium ion battery. Journal of Physics and Chemistry of Solids 2012, 73 (12), 1417-1419.

* cited by examiner

CATHODE STRUCTURE FUNCTIONALIZATION WITH POLYOXOMETALATES IN CONTACT WITH SOLID-STATE ELECTROLYTE FOR IMPROVED ALL-SOLID-STATE LITHIUM-ION BATTERY PERFORMANCE

PRIORITY STATEMENT

This application claims priority to U.S. Provisional Patent Application No. 63/067,396 filed on Aug. 19, 2020 titled Cathode structure functionalization with polyoxometalates in contact with solid-state electrolyte for improved all-solid-state lithium-ion battery performance, all of which is hereby incorporated by reference in their entirety.

BRIEF DESCRIPTION OF THE DRAWINGS

Illustrated embodiments of the disclosure are described in detail below with reference to the attached drawing figures, which are incorporated by reference herein.

BRIEF DESCRIPTION OF THE TABLES

Figure 1A:
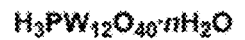
FIG. 1A is Polyhedral representation of the Keggin anion.
Figure 1A:
Figure 1A:
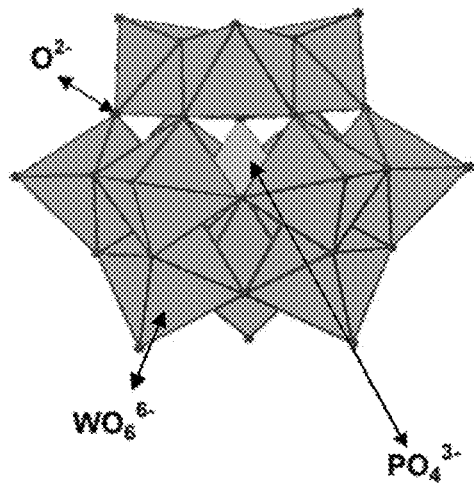
Figure 1B:
FIG. 1B is a polyhedral representation of the Keggin anion hexahydrate.
Figure 1B:
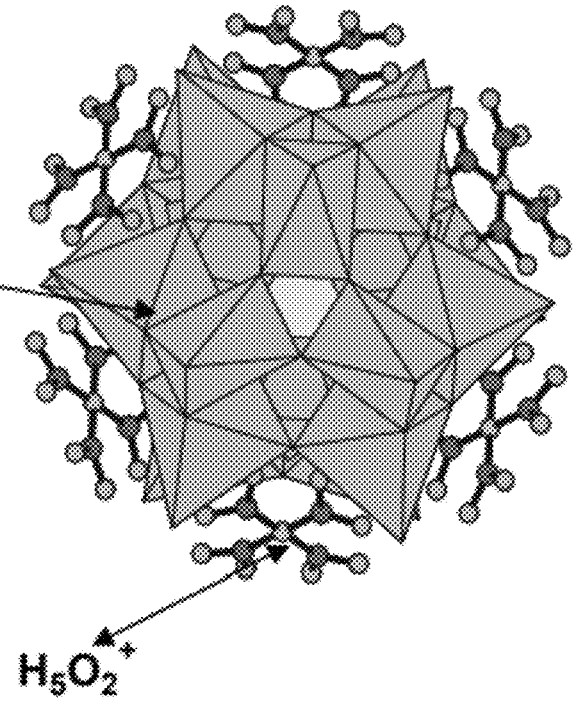

Illustrated embodiments of the disclosure are described in detail below with reference to the attached tables, which are incorporated by reference herein, and where:

TABLE 1 provides the electrical conductivity of various polyoxometalates.

INTRODUCTION

In solid-state batteries, morphology of the cathode architectures is different from the conventional cathodes with liquid electrolytes penetrating their porous structure. The solid-state battery cathodes should be dense and meet the requirements of high concentration of the cathode active phase for energy storage, sufficient concentration of carbon phase for electronic conductivity, and the amount of solid-state electrolyte that provides the required level of ionic conductivity. It is often difficult to meet these requirements and find an economically feasible approach for manufacturing of these dense and electrochemically stable cathode structures due to dissimilarity of their physical, chemical, and electrochemical properties.

Polyoxometalates, also known as heteropolyacids (HPAs) or Keggin structures (FIG. 1), form a large group of solid-state materials that possess extremely high ionic conductivities at room temperature (RT) in solid state (Table 1). Silicotungstic acid (STA) is one of the representatives of this group.

TABLE 1

| Compound | Conductivity (S/cm) |
| --- | --- |
| $H_3PW_{12}O_{40}\cdot29H_2O$ | $8 \cdot 10^{-2}$ |
| $H_3PW_{12}O_{40}\cdot21H_2O$ | $3.4 \cdot 10^{-3}$ |
| $H_3PW_{12}O_{40}\cdot14H_2O$ | $5 \cdot 10^{-4}$ |
| $H_3PW_{12}O_{40}\cdot6H_2O$ | $6.6 \cdot 10^{-5}$ |
| $H_3PMo_{12}O_{40}\cdot29H_2O$ | 0.13 |
| $H_3PMo_{12}O_{40}\cdot14H_2O$ | $1.0 \cdot 10^{-4}$ |
| $H_4SiW_{12}O_{40}\cdot30H_2O$ | $2.5 \cdot 10^{-3}$ |
| $Li_3PW_{12}O_{40}\cdot27H_2O$ | $1.25 \cdot 10^{-2}$ |
| $Li_3PW_{12}O_{40}\cdot13H_2O$ | $3.5 \cdot 10^{-4}$ |
| $Na_2HPW_{12}O_{40}\cdot15H_2O$ | $1.7 \cdot 10^{-4}$ |
| $Na_3PW_{12}O_{40}\cdot16H_2O$ | $6.6 \cdot 10^{-5}$ |
| $K_3PW_{12}O_{40}\cdot10H_2O$ | $1.3 \cdot 10^{-3}$ |
| $Rb_3PW_{12}O_{40}\cdot6H_2O$ | $6.0 \cdot 10^{-3}$ |
| $C53PW_{12}O_{40}\cdot8H_2O$ | $5.7 \cdot 10^{-4}$ |
| $MgHPW_{12}O_{40}\cdot27H_2O$ | $1.26 \cdot 10^{-2}$ |
| $MgHPW_{12}O_{40}14H_2O$ | $1.0 \cdot 10^{-4}$ |
| $CaHPW_{12}O_{30}\cdot21H_2O$ | $5 \cdot 10^{-3}$ |
| $BaHPW_{12}O_{40}\cdot7H_2O$ | $2 \cdot 10^{-5}$ |
| $BaHPW_{12}O_{40}\cdot13H_2O$ | $1.6 \cdot 10^{-4}$ |
| $CuHPW_{12}O_{40}\cdot9H_2O$ | $1.0 \cdot 10^{-6}$ |

As a result of $H_5O_2^+$ dissociation ($H_5O_2^+ \leftrightarrow H_3O^+ + H_2O \leftrightarrow H^+ + 2H_2O\uparrow$), the protonic moieties are formed that define the Grothuss mechanism of proton ion conductivity in HPAs or metal ion conductivity in HPA salts. For a given polyoxometalate, this conductivity decreases with the amount of water molecules within the structure (Table 1). The ratio of the protonic moieties changes the electron density around Keggin anions and defines the partially reversible redox behavior of tungsten ($W^{6+}$—$W^{5+}$) near the glass transition temperature (Tc)[1].

Protonic species formed within the polyoxometalates can react with the Keggin anion and change both its crystal structure and microstructure. As a result, HPAs and HPA salts of alkaline and alkaline earth metals (Me-HPAs) are sensitive to surrounding conditions, such as temperature and humidity. Dissociation of the $H_5O_2^+$ ions which interconnect Keggin anions via oxygen atoms, influence angles and interatomic distances. These changes are the greatest at the phase transition temperature (Tc) of polyoxometalates.

Polyoxometalates have broad range of applications as catalysts, supercapacitors[2], and ionically conductive cathode, anode, and electrolyte materials[3]. Specifically, Keggin-type aluminum polyoxocationic species ($Al_{13}$) have been used in lithium-ion battery anodes in combination with graphene oxide (GO). The proposed $Al_{13}$-GO intercalation resulted in much larger reversible capacity, compared to that of the pristine GO. It was explained by formation of an open framework, leading to the facile and effective access of lithium ions to all of available sites[4]. A polyoxometalate-based metal-organic framework was utilized as an anode material for lithium ion batteries by harvesting its multi-electron redox property. The exhibited reversible capacity of 750 mAh/g at 50 mA/g after 200 cycles is reported elsewhere[5].

Keggin type polyoxomolybdates, specifically $K_3PMo_{12}O_{40}$ (KPM), has been tested as lithium-ion battery cathodes[6]. KPM demonstrated charge-discharge capacity of 200 mAh/g in the potential range of 4.2-1.5V following the reaction of lithium ion de-/intercalation. The KPM capacity fade, dependent on the charge-discharge potential range, was explained by KPM isomerization.

Among many polyoxometalates, silicotungstic acid (STA) is known for its high proton conductivity reaching 0.02-0.1 S/cm at room temperature[7, 8]. In its lithium form, STA has been used as an additive for modification of lithium-ion battery liquid electrolytes[9]. Earlier, STA was used to modify NMC cathode particles for improvement of the lithium-ion battery performance[10].

Figure 2:
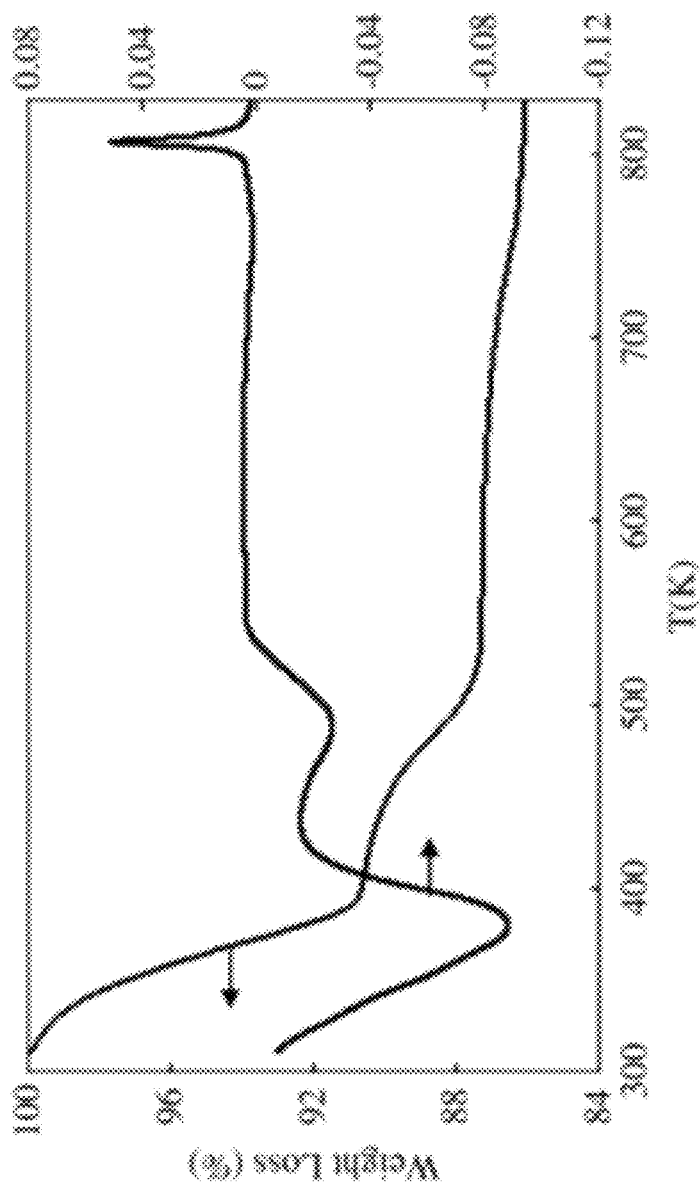
FIG. 2 is a graph illustrating TGA/DTA analysis of silicotungstic acid (STA)

The TGA/DTA analysis (10° C./min) of STA reveals the mechanism of water loss and thus, ionic conductivity trends depending on the processing conditions. Three weight loss regions have been identified (FIG. 2). The first two of these regions at 382 and 488 K correspond to the removal of physically adsorbed and crystal water, respectively. The weight loss between 650 K (377° C.) and 800 K is ascribed to the loss of chemically bonded water, also known as water of constitution. After removal of constitutional water, all the protons in STA structure are lost, meaning that no ionic conductivity is available anymore in this material.

Figure 3:
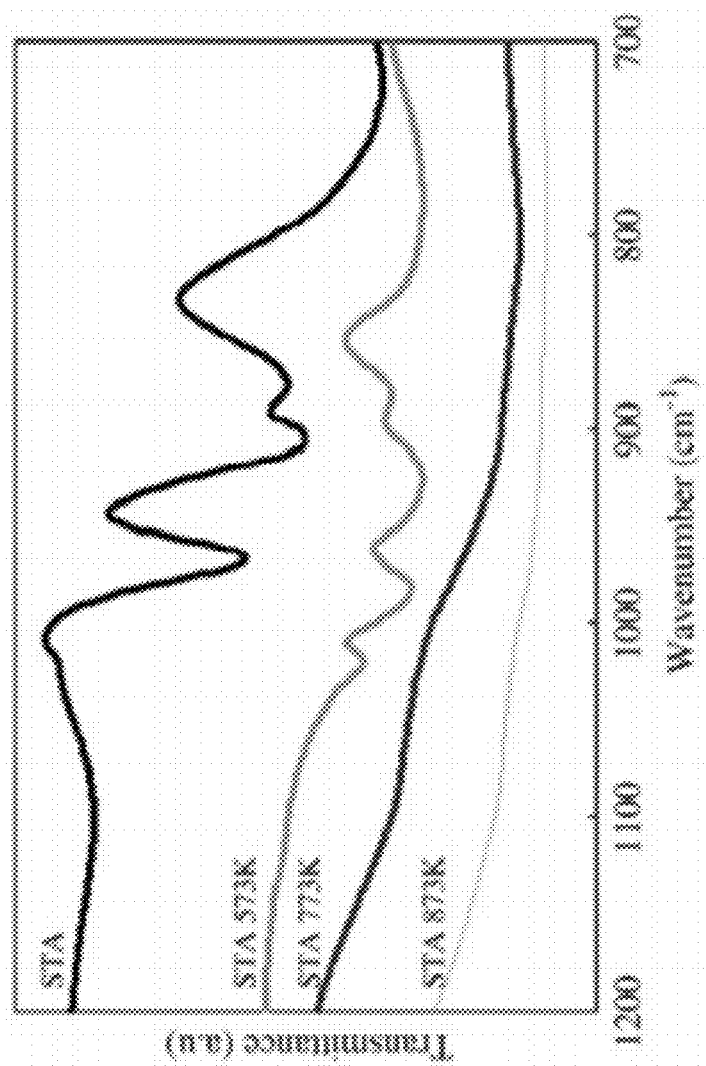
FIG. 3 is a graph illustrating FT-IR spectra of thermally treated STA in a wavenumber range of 700-1200 $cm^{-1}$.

FT-IR analysis confirms this observation. In the FT-IR analysis of untreated STA, a series of characteristic peaks is observed between 700-1200 cm$^{-1}$ (FIG. 3). The STA FT-IR bands obtained at 1100 cm$^{-1}$ (Si—O—Si), 968 cm$^{-1}$ (W-Od terminal), 903 cm$^{-1}$ (W-Ob-W edge shared) and 719 cm$^{-1}$ (W-Oc-W corner shared) correspond to the primary $[SiW_{12}O_{40}]^{-4}$ structure. FT-IR spectra for calcined STA at 773 K (500° C.) and above reveal complete decomposition of the characteristic Keggin structure (FIG. 3). Despite some shifts n wave numbers, the characteristic STA FT-IR spectrum was essentially conserved in the sample calcined at 573 K (300° C.).

FT-IR spectra obtained in the wave number range of 1200-3700 cm$^{-1}$ gave similar results, showing major changes for STA calcined at 773 (500° C.) and 873 K. The peak observed at 3300 cm$^{-1}$ was ascribed to OH$^{-1}$ groups. This peak is essentially lost in the spectra of the catalysts calcined at temperatures above 773 K (500° C.), confirming in correlation with TGA/DTA data the loss of protons of the catalyst.

The proposed disclosure is focused on functionalization of active cathode structures using HPA or Me-HPA for applications in solid-state batteries to improve adhesion, percolation, and conductivity. In the past, HPAs or Me-HPAs have not been used for surface modification of cathode particles in combination with solid-state glass-ceramic electrolytes.

Example 1. Lithium Iron Phosphate (Lfp) Cathode Particles Functionalized by Sta and Combined with Melted Lithium Halide (Li$_3$Clo)

Figure 4A:
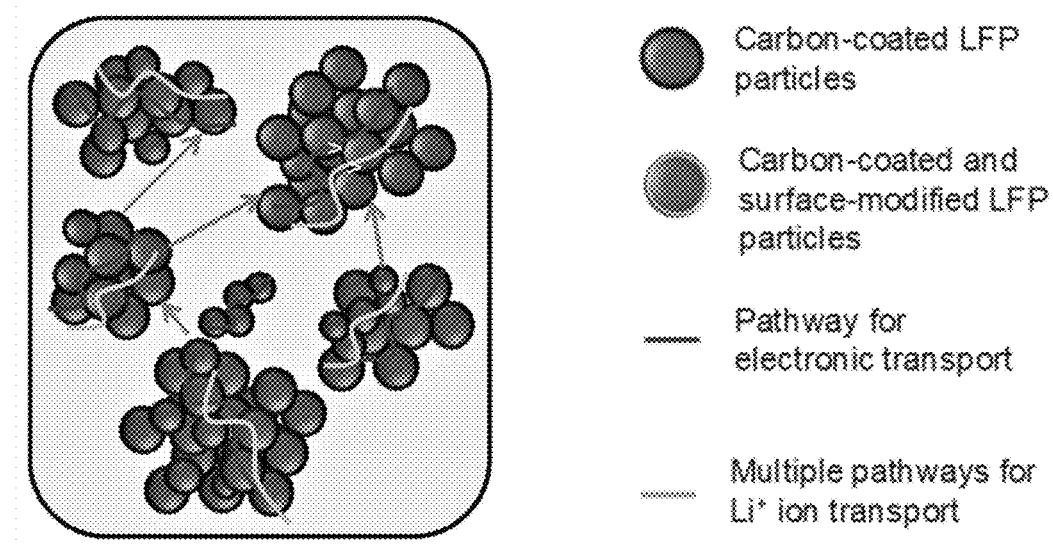
FIG. 4A is an illustration of the effect of surface functionalization of the cathode particles by HPA or Me-HPA: agglomeration of carbon-coated cathode particles in presence of solid-state electrolyte.
Figure 4B:
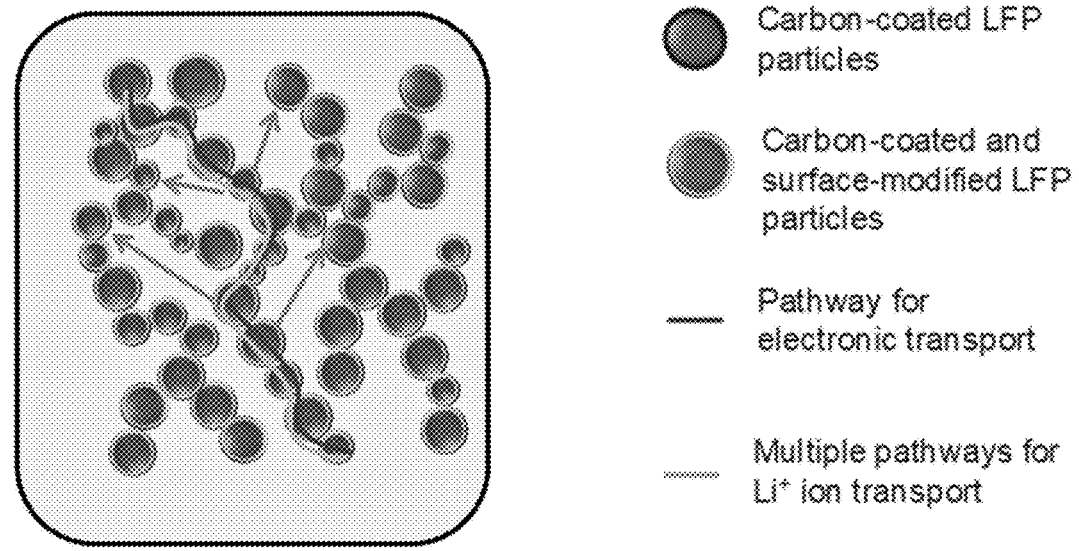
FIG. 4B is an illustration Effect of surface functionalization of the cathode particles by HPA or Me-HPA: Cathode particles functionalized with HPA or Me-HPA in solid-state electrolyte.

In all-solid state lithium-ion battery cathodes, HPA functionalization plays essential role in providing ionic and electronic conductivity at the interfaces between the active cathode particle and solid-state electrolyte (FIG. 4A and FIG. 4B). Based on the TGA/DTA and FT-IR analysis, calcination temperature of the HPA-functionalized cathode powders for mixing with melted solid-state electrolyte has been optimized.

Olivine cathodes, such as lithium iron phosphate (LFP) has a practical specific capacity of about 120-160 mAh/g, which is lower than the theoretical value 170 mAh/g, and an average discharge voltage of about 3.4 V at a C/20-rate. Electrochemical stability of LFP and absence of O$_2$ release during cell operation is defined by strong covalent bonding between oxygen and phosphorous in tetrahedral polyanions (PO4)$^{3-}$ with phosphorous in +5-oxidation state[12].

Since the presence of protons is critical for ionic, and specifically lithium-ion conductivity, the sintering temperatures for HPA-functionalized cathode particles was chosen below the critical temperature of 650K or 377° C.

In the example 1, LFP-based cathode powder was functionalized using silicotungstic acid (STA). Specifically, 0.5 g of LFP powder was mixed with isopropyl alcohol (IPA) solution containing different STA concentrations ranging from 0.001 to 0.005 g. After evaporation of the IPA solvent, the obtained cathode powders were partially heat-treated in the temperature range of 100-500° C., and more preferably in the temperature range of 100-300° C. resulting in different number of water molecules and thus different ionic conductivities. The produced materials were mixed with melted Li$_3$ClO antiperovskite to form cathode layers.

Visual characterization has been performed indicating uniform distribution of the cathode LFP particles within melted glass-ceramic electrolyte corresponding to schematic representation in FIG. 4A and FIG. 4B.

As evidenced from FIG. 4A and FIG. 4B, functionalization of the cathode particles, for example lithium iron phosphate (LFP) particles or any other cathode particles by HPA or lithium salts of heteropolyacid (Li-HPA), such silicotungstic acid (STA), silicomolibdic acid (SMA), phosphotungstic acid (PTA), eliminates agglomeration in melted Li$_3$ClO, improves adhesion with solid electrolyte after solidification, and result in even particle distribution within solid-state electrolyte, precise control of active cathode particles loading, and enhanced pathways for both electronic and ionic transport.

The HPA or Li-HPA functionalized cathode particles in contact with glass-ceramic electrolytes, such as lithium halides, phosphides, Li$_2$S—P$_2$S$_5$ sulfide-based electrolytes and it derivatives (e.g. Li$_3$P$_7$S$_{11}$, Li$_{10}$GeP$_2$S$_{12}$) in the range of the melting points 200-700° C. and more preferably 250-300° C. produce cathode mixed phase composites demonstrating low impedance and high lithium-ion and electronic conductivity relevant to high lithium-ion all-solid-state battery performance. It is assumed, that ionic conductivity is provided by the heteropolyacid or lithium salt of heteropolyacid, STA or Li-STA layers, in contact with solid-state electrolyte matrix. The electronic conductivity can be further enhanced by introducing graphite or graphite/carbon coating onto the cathode particles in contact with glass-ceramic electrolyte (FIG. 4A and FIG. 4B). Percolation pathways for both lithium-ion and electronic transport are available only in HPA or Li-HPA functionalized cathodes.

Example 2: Ac Impedance Spectroscopy Data of the Electrochemical Cell with Sta-Functionalized LFP Cathode Particles in Contact with Lithium Halide (Li$_3$Clo) Electrolyte Based on the disclosure provided in Example 1, the electrochemical cells with cathode comprising HPA-functionalized and carbon-coated LFP particles mixed with melted $Li_3ClO$, glass-ceramic lithium halide $Li_3ClO$ electrolyte in solid-state, and lithium-metal anode were assembled according to the following configuration: Al/C|LFP/C_STA|$Li_3ClO$|$Li_3ClO$|Li.

Figure 5:
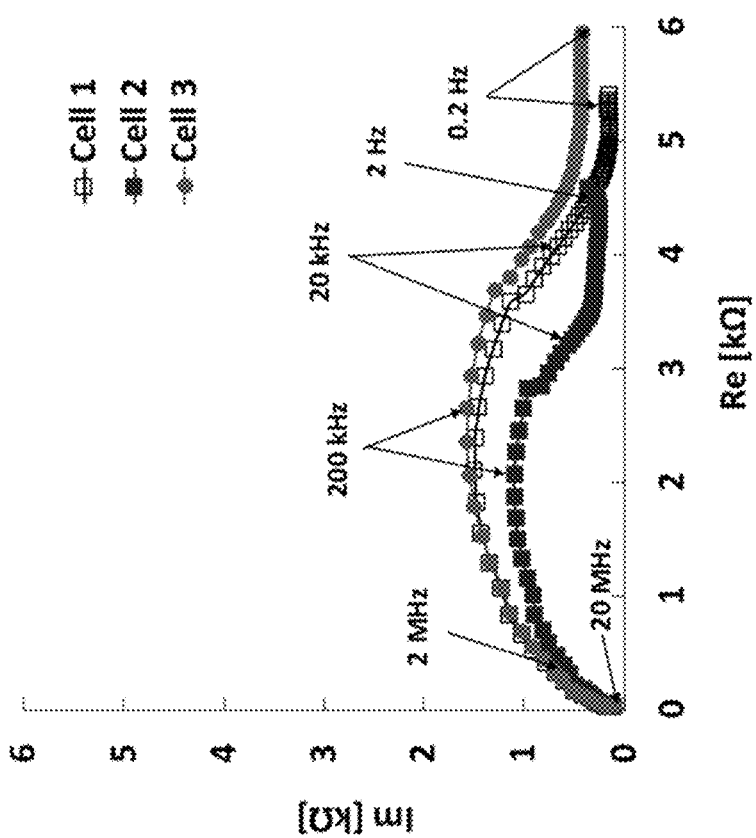
FIG. 5 is a graph illustrating the AC impedance spectra of three electrochemical cells with STA-functionalized LFP cathode particles in contact with solid-state Li3ClO electrolyte.

The AC impedance data of the electrochemical cells with surface functionalized LFP cathode is shown in FIG. 5. The cells were tested in an environmental chamber at a constant temperature of 100° C. During these tests, the corresponding frequency values were gradually changing from 2 MHz to 0.2 Hz. The charge transfer resistances of the three cells were observed in the range of 4.0±0.5 kO. These values did not change significantly after multiple cyclability tests, performed within broad range of C-rates and at extremely high current loads at 100° C. This electrochemical cell behavior indicates that the HPA-LFP-$Li_3ClO$ interfaces are electrochemically stable and that the produced cells performance deterioration is negligible over time. The observed charge transfer resistance at 100° C. is 4.0±0.5 kO at 100° C.

Figure 6:
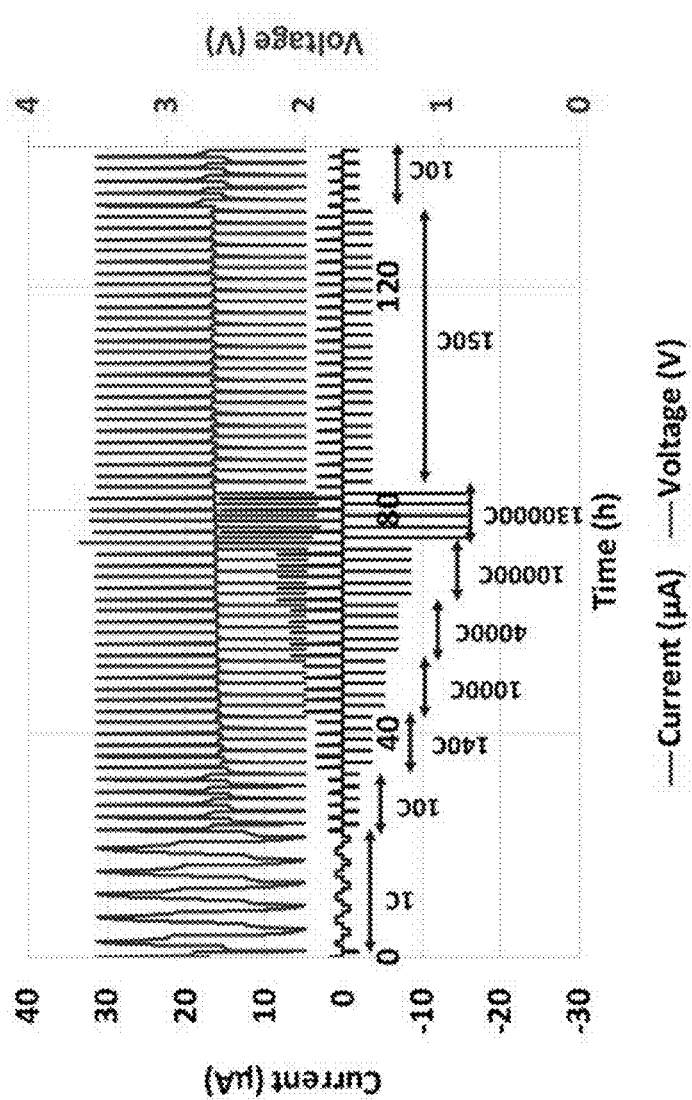
FIG. 6 is a graph illustrating current and voltage vs. time at 100° C. for a full electrochemical cell with HPA-functionalized LFP cathode particles in contact with $Li_3ClO$ solid-state electrolyte.

Example 3. Electrochemical Performance of the Cell with Sta-Functionalized LFP Cathode Particles in Contact with Lithium Halide ($Li_3Clo$) Electrolyte The discharge and charge of an electrochemical cell with HPA-modified LFP cathode is represented by C-rates and voltages as a function of time for the following full cell configuration: Al/C|LFP/C_STA|$Li_3ClO$|$Li_3ClO$|Li (FIG. 6). The active loading of the surface functionalized LFP cathode is 10 μg. The demonstrated average specific discharge and charge capacity at 1C is ~76 mA h/g and ~100 mA h/g, respectively.

The schedule for C-rate tests starts at low C-rates represented by low currents. The current is increased in steps to discharge and charge the electrochemical cell. Higher currents provide higher C-rates and thus, correspond to fast charging. A comparison of an electrochemical cell at 10C rate in the beginning and at the end of the test schedule indicate that the discharge and charge cycles have identical characteristics and are highly reproducible.

It is observed (FIG. 6) that at low C-rates, e.g., 1C, there is no difference between the charge and discharge rates. However, at high currents the discharge C-rate was reaching $1.3 \times 10^5 C$ while the charge C-rate rate was lower ($0.5 \; 10^5 C$) than during discharge. This observation indicates that at high currents the processes of lithium ion intercalation and deintercalation within the STA-functionalized LPF particles are different. This could be due to specific mechanisms of lithium ion transport in lithium halide-based cathodes during charge and discharge.

The observed phenomenon can be explained from the open circuit voltage (OCV) values at different currents. Specifically, during the one-hour rest-time at higher C-rates, the OCV reaches lower voltages, while at lower C-rates, the final OCV values reaches higher voltages. This phenomenon defines the size of the voltage window in-between charge and discharge cycles and correspondingly the time required to reach the required value. The loading of the active cathode material is 10 μg.

Figure 7:
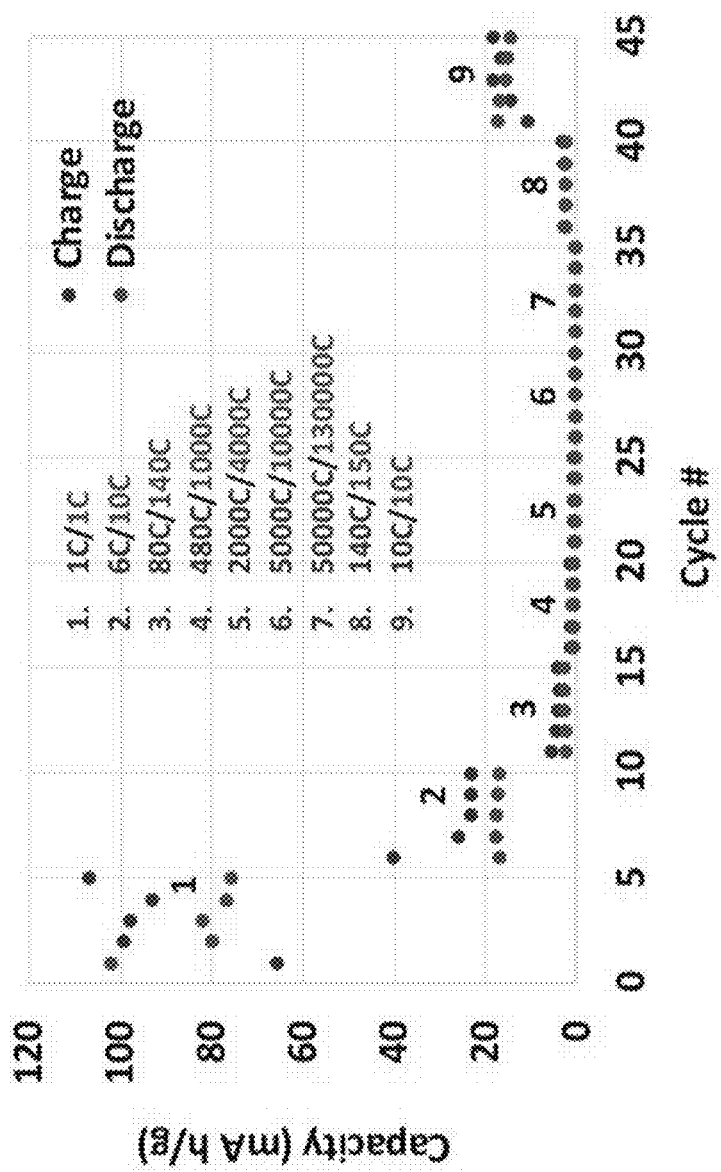
FIG. 7 is a graph illustrating specific capacity of the cell with cathode comprising carbon coated and STA-functionalized LFP particles in contact with solid-state electrolyte at 100° C. vs. the number of cycles at different C-rates.

The observed electrochemical cell behavior at high C-rates suggests that the proposed cells can be charged in seconds without causing explosion or cell deterioration. It is also important, that the average charge and discharge capacity is nearly the same even though the cell were exposed to extremely high C-rates (FIG. 7, steps 2 and 9). Unlike liquid cells, these all-solid-state cells are electrochemically stable at high currents and demonstrate high reproducibility after exposed to initial low C-rates or after multiple schedules.

Based on the experimental evidence, the observation was made that after exposing cells to high currents, they perform better and are more reproducible. For example, in the beginning of test schedule (FIG. 7, step 2) the charge and discharge rates differ significantly (6C vs. 10C). However, in the end of the schedule (FIG. 7, step 9) the C-rate values for charge and discharge at 10C are the same. The loading of the active cathode material is 10 μg.

Figure 8:
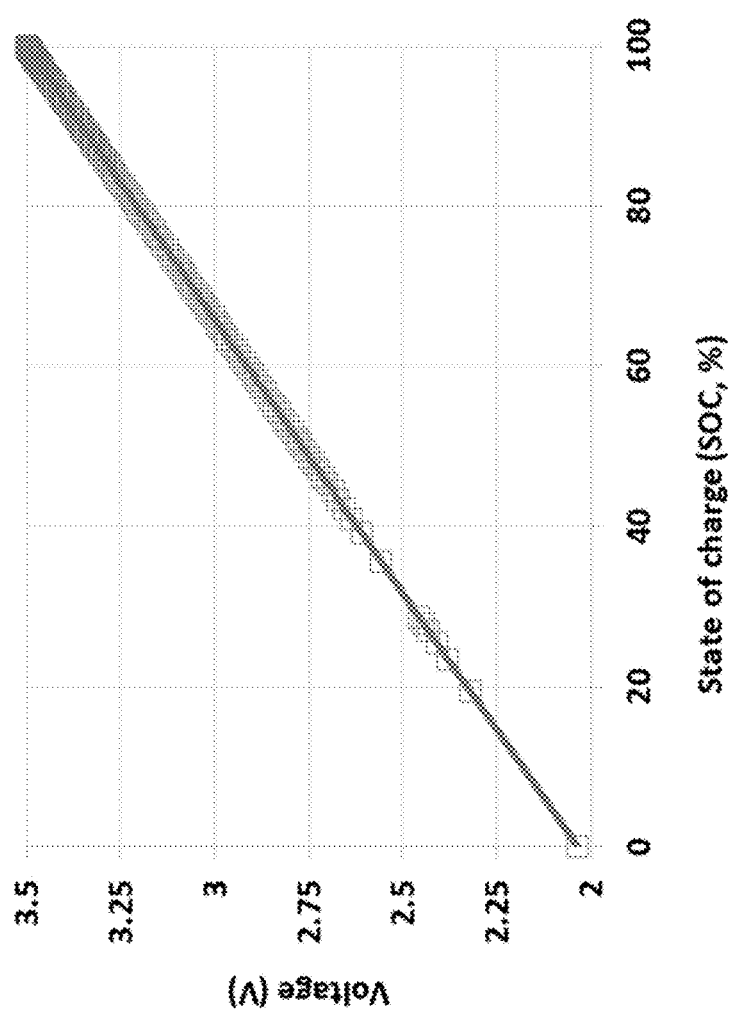
FIG. 8 is a graph illustrating voltage vs. SoC for the electrochemical cell with cathode comprising carbon coated and STA-functionalized LFP particles in contact with solid-state electrolyte in the voltage range 2-3.5V at 100° and 1C rate.

Depending on the electrochemical performance observation in numerous cycles, the lower and upper limits of the cell voltage are determined as 2.0 V and 3.5 V, respectively. Using these limits, the state of charge (SOC) in terms of percentage was calculated considering that the SOC values equal 0% and 100% at 2.0 V and 3.5 V, respectively. The SOC of the cell comprised of STA-functionalized LFP particles in contact with solid-state electrolyte is provided in FIG. 8. The cell demonstrates a linear relationship between the SOC and the applied voltage.

Example 4. Differential Voltage Analysis of the Electrochemical Cell with Sta-Functionalized LFP Cathode Manufactured in Presence of Melted Lithium Halide ($Li_3Clo$) Electrolyte Methods of differential voltage and capacity are known as reliable diagnostic tools for evaluation of the electrochemical systems behavior and cell failures. The dV/dt and dC/dt functions provide a "fingerprint" of a battery system that can be tracked throughout its life, and changes in these plots give insight into the future behavior of the system.

Figure 9:
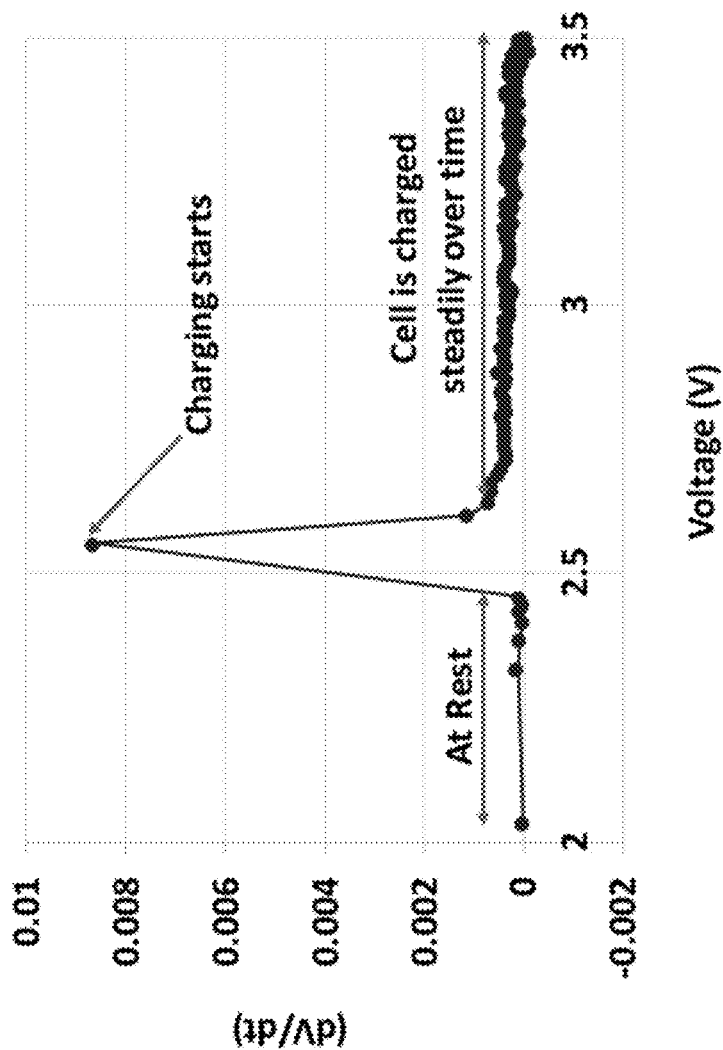
FIG. 9 is a graph illustrating differential voltage (dV/dt) for the electrochemical cell with cathode comprising carbon coated and STA-functionalized LFP particles in contact with solid-state electrolyte at 100°.

In FIG. 9, the change in voltage over time (dV/dt), i.e., slope steepness, is shown to demonstrate the cell performance during the charge cycle considering that the rest time between charge and discharge cycles is one hour. During the rest time, no load is provided indicating a flat curve. As soon as the cell starts to charge and the current is applied, a steep increase in dV/dt value is observed. After that, the cell demonstrates steady charge over time at constant current in the voltage range of 2.0-3.5V.

What is claimed is:

1. A solid-state ionically and electronically conductive mixed phase cathode composite comprising:
   a) at least one polyoxometalate comprising at least tungsten;
   b) at least one metal oxide material capable of intercalation and deintercalation of metal ions, wherein the polyoxometalate prevents agglomeration of the at least one metal oxide material;
   c) at least one solid-state electronically conductive material comprising at least a group selected from graphite or carbon; and
   d) at least one solid-state ionically conductive material is selected from the group consisting of glass-ceramic materials and lithium halides, wherein the glass-ceramic materials and lithium halides include antiperovskites.

2. The mixed phase cathode composite of claim 1, wherein the polyoxometalates are selected from the group consisting of Keggin structures, heteropolyacids (HPAs), and metal salts of heteropolyacids.

3. The mixed phase cathode composite of claim 1, wherein the electronically conductive material is coated with polyoxometalates.

4. The mixed phase cathode composite of claim 1, wherein the mixed phase cathode has a lower limit of 2.0V and an upper limit of 5.0V.

5. The mixed phase cathode composite of claim 1, wherein metal oxide stores metal ions from the alkali and alkali earth groups in the periodic table.

6. The mixed phase cathode composite of claim 2, wherein Polyoxometalates form functional layers on the surface of metal oxide cathode particles in contact with electronically conductive carbon-based material for enhanced ionic and electronic transport pathways and percolation.

7. The mixed phase cathode composite of claim 2, wherein functional layers of polyoxometalates in the thickness range of 1-10 μm are in contact with metal oxide material that are chemically stable in presence of glass-ceramic solid-state electrolytes at the temperatures up to 500° C.

8. The mixed phase cathode composite of claim 4, wherein the composite is formed by surface functionalization of the metal oxide and carbon-based structures with HPA or Li-HPA for further contact with solid-state electrolyte achieved by mixing at temperatures exceeding the melting temperatures of the said solid-state electrolyte.

9. The mixed phase cathode composite of claim 3, wherein the metal oxide or carbon-based structures coated with HPAs or Li—HPAs are miscible with solid-state ionically conductive phase in melted state.

10. An electrochemical device, comprising:
   at least one layer comprising a mixed phase composite of:
   a) at least one polyoxometalate comprising at least tungsten;
   b) at least one metal oxide material capable of intercalation and deintercalation of metal ions;
   c) at least one solid-state electronically conductive material comprising at least graphite; and
   d) at least one solid-state ionically conductive material comprising at least lithium.

11. The electrochemical device of claim 10, wherein the device comprises a lithium-ion electrochemical cell.

12. The electrochemical device of claim 10, further comprising:
   a cathode formed from the mixed phase composite.

13. The electrochemical device of claim 10, further comprising:
   an HPA or Li-HPA functional layer between a solid-state metal oxide cathode particle, a carbon-based particles, and the solid-state ionically conductive material.

14. The electrochemical device of claim 13, further comprising:
   adhesion between HPA or Li-HPA functional layers and the solid-state metal oxide cathode particles or the carbon-based particles in presence of the solid-state ionically conductive material.

15. The electrochemical device of claim 13, further comprising:
   an electrochemical stability in presence of the solid-state ionically conductive material due to a charge transfer resistance within a range of 4.0±0.5Ω.

16. The electrochemical device of claim 10, wherein the at least one solid-state ionically conductive material is melted $Li_3ClO$.

17. The electrochemical device of claim 10, further comprising:
   a lithium-ion or lithium-metal electrochemical cell operating at the temperatures up to 150° C.

18. The electrochemical device of claim 10, further comprising:
   a lithium-ion or lithium-metal electrochemical cell operating in a voltage range of 2.0V-5.0V.

* * * * *